United States Patent
Sun et al.

(10) Patent No.: US 10,442,734 B2
(45) Date of Patent: Oct. 15, 2019

(54) FOAM FORMULATION AND METHOD OF PREPARING SOLID POROUS MATERIALS WITH SAME

(71) Applicant: Nano and Advanced Materials Institute Limited, Hong Kong (HK)

(72) Inventors: Guoxing Sun, Hong Kong (HK); Tomi Pekka Bernhard Nissinen, Hong Kong (HK); Ivan M. L. Sham, Hong Kong (HK)

(73) Assignee: Nano and Advanced Materials Institute Limited, Hong Kong (HK)

(*) Notice: Subject to any disclaimer, the term of this patent is extended or adjusted under 35 U.S.C. 154(b) by 0 days.

(21) Appl. No.: 15/146,921

(22) Filed: May 5, 2016

(65) Prior Publication Data
US 2017/0321026 A1 Nov. 9, 2017

(51) Int. Cl.
C04B 35/00 (2006.01)
C04B 38/10 (2006.01)
C08J 9/30 (2006.01)

(52) U.S. Cl.
CPC .......... C04B 35/00 (2013.01); C08J 2325/06 (2013.01)

(58) Field of Classification Search
CPC .. C04B 35/00; C04B 38/10; C08J 9/30; C08J 9/0095
See application file for complete search history.

(56) References Cited

U.S. PATENT DOCUMENTS

| | | | |
|---|---|---|---|
| 6,051,617 A * | 4/2000 | Sasaki | C08F 255/02 521/139 |
| 2005/0277045 A1 * | 12/2005 | Saito | G03G 9/0806 430/109.3 |
| 2009/0325780 A1 * | 12/2009 | Gauckler | A61L 27/105 501/84 |
| 2014/0245929 A1 | 9/2014 | Lafarge | |

OTHER PUBLICATIONS

Zeng et al., "Preparation of Functionalized Core-Shell Alumina/Polystyrene Composite Nanoparticles, Encapsulation of Alumina via Emulsion Polymerization," from Macromolecular Chemistry and Physics, 2005, 206, pp. 1558-1567 (Year: 2005).*
Urs T. Gonzenbach et al., Stabilization of Foams with Inorganic Colloidal Particles, Langmuir, 2006, pp. 10983-10988, vol. 22, No. 26.

* cited by examiner

Primary Examiner — Kara B Boyle (57) ABSTRACT

A foam formulation for preparing polymer-grafted nanoparticles stabilized foam, including nanoparticles, monomers of a polymer to be grafted on the nanoparticle surface, polymerization initiator, surfactant and water. The polymer-grafted nanoparticles may act together with the surfactant to form single-layer assembling at the boundary of bubbles, which in turn stabilizes the foam. The generated foam shows much better stability in long-term storage, high-temperature drying process and alkaline environments than conventional wet foams. A method of preparing solid porous materials with the foam is also provided.

17 Claims, 6 Drawing Sheets

FOAM FORMULATION AND METHOD OF PREPARING SOLID POROUS MATERIALS WITH SAME

FIELD OF THE PATENT APPLICATION

The present application relates to a foam formulation. More specifically, the present application relates to a foam formulation for preparing polymer-grafted nanoparticles stabilized foam. The present application also relates to a method of preparing solid porous materials with the foam.

BACKGROUND

The fatal weakness of conventional wet foams is the low stability, degradation in alkaline environment and high costs caused by high nanoparticle content. These inevitable problems seriously limit their industrial applications. Although a few types of stable foams, for example protein and nanoparticle stabilized foams, have been demonstrated to form wet foams with dramatically enhanced stability, the high cost of protein and high content nanoparticles, and the degradation of the nanoparticle stabilized foams seriously limit their useful applications. Therefore, the formation and exploitation of new types of stable foams with high stability in various environments and low costs have become major challenges.

SUMMARY

The present application is directed to a foam formulation for preparing polymer-grafted nanoparticle stabilized foams. In one aspect, the foam formulation may include hydrophilic nanoparticles, monomers of the polymer to be grafted on the nanoparticle surface, polymerization initiator, surfactant and water. The amount of water may be between about 90.0 wt % to about 99.9 wt %, and preferably about 99.2 wt %.

The foam formulation may further include at least one hydrophilic solvent selected from the group consisting of alcohols, ketones, and any combinations thereof. The hydrophilic solvents may include at least one member selected from the group consisting of ethyl alcohol, acetone, and any combinations thereof. The total amount of the hydrophilic solvents may be between 90.0 wt % and 99.9 wt %.

The foam may be generated by forming a suspension including a dispersed phase and a continuous medium of water and/or one or more hydrophilic solvents, wherein the dispersed phase may include the nanoparticles and the monomers together with the initiator and surfactant for adjusting the zeta potential of the suspension and keeping the stability of the nanoparticles; and introducing gas into the suspension via mechanical stirring or using a foaming machine until the whole suspension is homogeneously foamed or partially foamed. The foam may be generated at a temperature of about 25-100° C., preferably about 50-100° C., and more preferably about 70-80° C. The foam may be generated at a stirring speed in the range of about 500-1000 rpm, preferably about 600-800 rpm, and even more preferably about 650-750 rpm.

The nanoparticles may include at least one member selected from the group consisting of titanium oxide, calcium carbonate, mullite, silicon carbide, silicon nitride, boron nitride, boron carbide, cordierite, silicas, zirconia, spinels, hydroxyapatite, tricalcium phosphate, alumina, cerium-gadolinium oxide, magnesia, tin oxide, cerium oxide, nickel nitrate, nickel carbonate, metal, alloy such as ferrochrome and ferrosilicon, and any combinations thereof.

The nanoparticles may have mean particle sizes ranging from about 10 to about 500 nm, preferably from about 10 to about 50 nm, and more preferably from about 10 to about 30 nm. The content of nanoparticles may be from about 0.01 wt % to about 1 wt %, preferably about 0.1 wt % to about 0.5 wt %, more preferably about 0.25 wt %.

The pH value of the foam formulation may be ranged from about 3 to about 8, preferably from about 4 to about 7, and more preferably at about 5.

The polymer may include at least one member selected from the group consisting of polystyrene, poly(butyl acrylate), poly(methyl methacrylate), poly(2-hydroxyethyl methacrylate), and any combinations thereof. The concentration of monomers may be below about 1 wt % of the foam formulation.

The initiator may include at least one member selected from the group consisting of ammonium persulfate (APS), potassium persulfate (KPS), sodium persulfate (SPS), 2,2'-Azobis (isobutyramidine) dihydrochloride (NA), and any combinations thereof. The concentration of initiator may be below about 10 wt % of the suspension.

The surfactant may include at least one member selected from the group consisting of sodium dodecyl sulfate (SDS), sodium dodecyl benzene sulfonate (SDBS), anionic polyacrylamide (APAM), sodium hydroxyethyl sulfonate, ammonium dodecyl sulfate, sodium dodecyl ether sulfate, sodium myreth sulfate, octenidine dihydrochloride, cetrimonium bromide (CTAB), cetylpyridinium chloride (CPC), benzalkonium chloride (BAC), benzethonium chloride (BZT), dimethyldioctadecylammonium chloride, dioctadecyldimethylammonium bromide (DODAB), polyoxyethylene glycol alkyl ethers, polyoxypropylene glycol alkyl ethers, glucoside alkyl ethers, polyoxyethylene glycol octylphenol ethers, polyoxyethylene glycol alkylphenol ethers, glycerol alkyl esters, polyoxyethylene glycol sorbitan alkyl esters, sorbitan alkyl esters, dodecyldimethylamine oxide, block copolymers of polyethylene glycol and polypropylene glycol, polyethoxylated tallow amine, and any combinations thereof. The concentration of surfactant may be below about 1 wt % of the foam formulation.

The foam may be dried at temperatures higher than about 35° C. to give a self-supporting monolith. The self-supporting monolith may be implanted into water, a suspension of water or inorganic particle paste, and foamed by physically stirring or using a foaming machine. The inorganic particle paste may include at least one member selected from the group consisting of Portland cement, magnesium potassium phosphate cements (MPCs), geopolymers, gypsum, oxides, carbides, nitrides, phosphates, carbonates, polysaccharides, salts, metals, polymers, fats, and any combinations thereof.

In another aspect, the present application is directed to a method of preparing solid porous materials. The method may include generating wet polymer-grafted nanoparticle stabilized foam from the above foam formulation, mixing the foam with a matrix, drying the foam to remove any solvent, and sintering the dried foam to give a sintered material. The wet foam may be freshly prepared or by mixing dried foam prepared from the above foam formulation with water. The foam may be dried by air drying, freeze drying, unidirectional drying or slip casting. The sintered material may be used as a non-structural construction and building material including a façade panel, a partition wall, a thermal insulating wall, or a sound proof wall.

DETAILED DESCRIPTION

Reference will now be made in detail to preferred embodiments of foam formulations and methods of preparing solid porous materials disclosed in the present application, examples of which are also provided in the following description. Exemplary embodiments of the foam formulations and the methods of preparing solid porous materials disclosed in the present application are described in detail, although it will be apparent to those skilled in the relevant art that some features that are not particularly important to an understanding of the present application may not be shown for the sake of clarity.

Before the present application is described in further detail, it is to be understood that the terminology used herein is for the purpose of describing particular embodiments only, and is not intended to be limiting, since the scope of the present application will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the application. The upper and lower limits of these smaller ranges that may independently be included in the smaller ranges is also encompassed within the application, subject to any specifically excluded limit in the stated range. Where the stated range includes one or both of the limits, ranges excluding either or both of those included limits are also included in the application.

Unless defined otherwise, all technical and scientific terms used herein have the same meaning as commonly understood by one of ordinary skill in the art to which this application belongs. Although any methods and materials similar or equivalent to those described herein can also be used in the practice or testing of the present application, a limited number of the exemplary methods and materials are described herein.

It must be noted that as used herein and in the appended claims, the singular forms "a", "an", and "the" include plural referents unless the context clearly dictates otherwise.

In a first aspect, the present application provides a foam formulation for preparing a polymer-grafted nanoparticle stabilized foam. Compared to conventional wet foams, the foam prepared in the present application shows much better stability in long-term storage, high-temperature drying process and alkaline environments. In addition, the foam is more economical due to the low nanoparticle content compared to other stable foams.

The foam formulation of the present application includes nanoparticles, monomers of a polymer to be grafted on the nanoparticle surface, polymerization initiator, surfactant and water. The foam formulation may optionally include one or more hydrophilic solvents.

The range of amount of water in the foam formulation may be between about 90.0 wt % to about 99.9 wt %, and preferably about 99.2 wt %. The foam product ratio is lower than 124 (volume of foam to weight of raw materials except water) if the amount of water is below 99.2 wt %, and the foam product ratio remains 124 when the amount of water is above 99.2 wt %.

Suitable hydrophilic solvents can be alcohols and ketones, such as ethyl alcohol and acetone, and the amount of the solvents in the foam formulation may be between 90.0 wt % and 99.9 wt %.

The foam may be prepared with the above foam formulation by the following steps:

forming a suspension including a dispersed phase and a continuous medium of water and/or one or more hydrophilic solvents, wherein the dispersed phase may include the nanoparticles and the monomers together with the initiator and surfactant for adjusting the zeta potential of the suspension and keeping the stability of the nanoparticles; and introducing gas into the suspension via mechanical stirring or using a foaming machine until the whole suspension is homogeneously foamed or partially foamed.

The nanoparticles are initially hydrophilic. When the above foam formulation is prepared and stirred, the surface of the nanoparticles may be partially grafted with polymer chains through an in-situ polymerization. The polymer-grafted nanoparticles may then act together with the surfactant to form single-layer assembling at the boundary of bubbles, which in turn stabilizes the foam.

The polymerization may be described in the free radical equations below:

1. Chain initiation:

$$I \rightarrow R^*, \quad R^* + M \rightarrow RM^*$$

2. Chain growth:

$$RM^* + M \rightarrow RM_2^*$$

$$RM_2^* + M \rightarrow RM_3^*$$

$$RM_{n-1}^* + M \rightarrow RM_n^*$$

3. Chain termination:

$$RM_n + T \rightarrow Polymer$$

I: Initiator, R*: Free Radical, M: Monomer, T: Terminator

The in-situ polymerization of hydrophobic monomers on the surfaces of nanoparticles may be carried out in an emulsion of an anionic surfactant.

Suitable nanoparticles may include nanoparticles of titanium oxide, calcium carbonate, mullite, silicon carbide, silicon nitride, boron nitride, boron carbide, cordierite, silicas, zirconia, spinels, hydroxyapatite, tricalcium phosphate, alumina, cerium-gadolinium oxide, magnesia, tin oxide, cerium oxide, nickel nitrate, nickel carbonate, metals, alloys such as ferrochrome and ferrosilicon, or mixtures thereof. The mean particle sizes of the nanoparticles may be ranged from about 10 to about 500 nm, preferred to be ranged from about 10 to about 50 nm, and more preferred to be ranged from about 10 to about 30 nm. The range of nanoparticle content in the suspension may be from about 0.01 wt % to about 1 wt %, preferably to be about 0.1 wt % to about 0.5 wt %, more preferably to be about 0.25 wt %.

The nanoparticles may have a positive zeta potential at pH 8 or below. The pH value of the foam formulation may be ranged from about 3 to about 8, preferably from about 4 to about 7, and more preferably be at about 5.

While not wishing to be bound by theory, it is believed that the key component which contributes to the desired properties of the foam is the grafting of polymer chains on the surfaces of nanoparticles. Monomers suitable for in-situ polymerization of these polymer chains contain an unsaturated hydrocarbon group (e.g. carbon-carbon double bond) and no hydrophilic groups, and are able to partially lyophilize the nanoparticles and make the nanoparticles to assemble at the gas-liquid interface. Suitable polymers may include those which are hydrophobic and can be synthesized via free radical polymerization in an emulsion. Examples of suitable polymers may include polystyrene, poly(butyl acrylate), poly(methyl methacrylate), and
poly(2-hydroxyethyl methacrylate), The concentration of monomers suitable for in-situ polymerization is below about 1 wt % of the foam formulation.

The initiator for in-situ surface polymerization of monomers is preferably water-soluble. Suitable initiator may include but is not limited to ammonium persulfate (APS), potassium persulfate (KPS), sodium persulfate (SPS) or 2,2'-Azobis (isobutyramidine) dihydrochloride (NA). The connection between the nanoparticles and the initiator is established via electrical interaction due to their opposite charges. However, the zeta potential of the nanoparticles decreases with the addition of the initiator. Foam can hardly be obtained if too little initiator is added. When too much initiator is added, the zeta potential of nanoparticles may be too low, leading to an obvious precipitation in the suspension and coalescence and/or disproportionation of the foam. An optimal amount of the initiator should be the one sufficient to initiate the polymerization at the same time keeping the stability of the suspension. In some embodiments of the present application, the concentration of initiator is below about 10 wt % of the ANs. In some particular embodiments of the present application where alumina nanoparticles (ANs) and APS as the initiator are used, the APS content may range from 0.5 wt % to 12 wt % of the ANs. In some embodiments, the APS content may range from 0.5 wt % to 9 wt % of the ANs, 0.5 wt % to 6 wt % of the ANs, 1.5 wt % to 4.5 wt % of the ANs, 2 wt % to 4 wt % of the ANs, or 2.5 wt % to 3.5 wt % of the ANs. In some preferred embodiments, the optimal amount of APS is 3 wt % of the ANs.

The surfactant acts as a bridging agent in the polymerization. Under the promotion of surfactant, the hydrophobic monomer can react with the initiator. The surfactant used in the foam formulation may be an anion surfactant, such as sodium dodecyl sulfate (SDS), sodium dodecyl benzene sulfonate (SDBS), anionic polyacrylamide (APAM), sodium hydroxyethyl sulfonate, ammonium dodecyl sulfate, sodium dodecyl ether sulfate, sodium myreth sulfate, octenidine dihydrochloride, cetrimonium bromide (CTAB), cetylpyridinium chloride (CPC), benzalkonium chloride (BAC), benzethonium chloride (BZT), dimethyldioctadecylammonium chloride, dioctadecyldimethylammonium bromide (DODAB), polyoxyethylene glycol alkyl ethers, polyoxypropylene glycol alkyl ethers, glucoside alkyl ethers, polyoxyethylene glycol octylphenol ethers, polyoxyethylene glycol alkylphenol ethers, glycerol alkyl esters, polyoxyethylene glycol sorbitan alkyl esters, sorbitan alkyl esters, dodecyldimethylamine oxide, block copolymers of polyethylene glycol and polypropylene glycol, or polyethoxylated tallow amine. The concentration of surfactant is below about 1 wt % of the foam formulation.

The terminator is not necessary in the polymerization for preparing the foam. The limiting step for this in-situ polymerization is the step of chain growth. The monomers in the surfactant micelle slowly react with the polymerization initiator on the surfaces of the nanoparticles, and increase the chain length.

By dispersing the nanoparticles, initiator and surfactant in water to form a uniform suspension and slowly adding the monomer with stirring, the foam containing polymer-grafted nanoparticles can be obtained. The whole suspension may be partially or homogeneously foamed.

The temperature and stirring speed of the reaction are important but not strictly limiting. The ranges of reaction temperature may be about 25-100° C., preferably about 50-100° C., and more preferably about 70-80° C. If the reaction is carried out at room temperature, foam can also be fabricated, but the product ratio may be decreased to about 50% of that produced at 80° C. The remaining unreacted nanoparticles may precipitate at the bottom of the reactor.

The stirring speed of the reaction should not be too low. Otherwise, the monomers cannot be dispersed thoroughly in the suspension, and the foam cannot be fabricated. However, if the stirring speed is too high, the surfactant in the foam formulation will generate a large amount of foam in a short time, which is very unstable. In some embodiments, the stirring speed may be in the range of about 500-1000 rpm, preferably about 600-800 rpm, and even more preferably about 650-750 rpm.

The foam product ratio (volume of foam:volume of foam formulation prepared) increases gradually with the stirring time and reaches the maximum 1:1 ratio after about 6 h. The stirring time is ranged from 10 min to 6 h with different product ratios.

Unlike the traditional nanoparticle-stabilized foams, which are sensitive with pH value and lose their workability in alkaline environment, the foams fabricated by polymer-grafted nanoparticles remain the stability in a large range of pH due to the chemical stability of the polymer chains. The foam can remain stable in pH value from 1-14, preferably 3-14.

The foam generated from the foam formulation of the present application may exhibit stability against coalescence and coarsening for more than 28 days. The wet foam may have an air content of up to 97% and bubble sizes ranging from 1 μm to 1 mm. The nanoparticles may have an amount ranging from 0.01 to 1 vol % of the foam.

The stable foam generated from the above foam formulation may be dried at temperatures higher than about 35° C. The thoroughly dried foam retaining its original shape can be obtained as a self-supporting monolith.

The self-supporting monoliths can be implanted into water, a suspension of water or inorganic particle paste, and foamed by physically stirring or using a foaming machine. The inorganic particle paste may include Portland cement, magnesium potassium phosphate cements (MPCs), geopolymers, gypsum, oxides, carbides, nitrides, phosphates, carbonates, polysaccharides, salts, metals, polymers, fats, or mixtures thereof.

In another aspect, the present application provides a method of preparing solid porous materials, including generating a wet polymer-grafted nanoparticle stabilized foam from the above foam formulation, mixing the foam with a matrix, drying the foam to remove the solvent, and sintering the dried foam.

In some embodiments, the wet foam may be freshly prepared. In some embodiments, the wet foam may be prepared by mixing the dried foam containing polymer-grafted nanoparticle with water. The wet foam may include one or more hydrophilic solvents. Additives can be added to produce wet foams and functional solid porous materials.

The matrix to be mixed with the foam may include Portland cement, magnesium potassium phosphate cements (MPCs), geopolymers, gypsum, oxides, carbides, nitrides, phosphates, carbonates, polysaccharides, salts, metals, polymers, fats or mixtures thereof.

After mixing with the matrix, the foam may be dried by air drying, freeze drying, unidirectional drying or slip casting. The dried foam may be sintered at usual sintering temperatures.

The sintered material may be a light weight ceramic, cement or geopolymer with improved compressive strength. In some embodiments where the matrix is Portland cement, the foam cement may have a density ranging from 100 to 2000 kg/m$^3$ and may have a compressive strength up to at least 2 MPa at 450 kg/m$^3$ density. In some embodiments, the foam cement may have a pore size ranging from 1 μm to 1 mm, preferably from 1 μm to 500 μm, more preferably from 1 μm to 50 μm.

In some embodiments wherein the matrix is geopolymer, the foam geopolymer may have a density ranging from 100 to 2000 kg/m$^3$ and may have a compressive recoverable deformation up to at least 10% at 400 kg/m$^3$ density. The foam geopolymer may have a pore size ranging from 1 μm to 50 μm at 400 kg/m$^3$ density.

The sintered materials can be used as non-structural construction and building materials including façade panel, partition wall, thermal insulating wall, and sound proof walls in buildings.

Example 1—Preparation of Polymer-Grafted Nanoparticle Foam 0.5 g Alumina nanoparticles (ANs) with a density of 4 g/cm$^3$, 0.015 g APS and 0.1 g SDS were added into 200 mL deionized water and stirred at 10 rpm for 1 minute to form a suspension. Then 1 mL styrene was added slowly at 0.5 mL/min into the suspension under stirring at 300 rpm. The suspension was then stirred at 650 rpm at 80° C., 1 atm for 6 h. The foam started to generate after stirring for 10 min. The generated foam was floated on water and was taken out from the reactor by injecting water into the flask.

Example 2—Preparation of Polymer-Grafted Nanoparticle Foam

Example 1 was repeated using 2 g ANs with density of 4 g/cm$^3$ in 800 mL water. 800 mL stable foam was produced within 6 h. The rate on this reaction is about 133 mL/h. As a reference of comparison, the nanoparticle content in U.S. patent application published under US20090325780A1 is at least 1 vol % of the suspension, preferably 5 vol %, while the nanoparticle content in the literature Langmuir 2006, 22, 10983-10988 is about 35 vol % of the suspension. The nanoparticle contents of the foam generated and of the suspension in this Example are 0.06 vol %, which is the lowest content achieved so far.

The optimized polymer chain length on the surface of ANs can thus be calculated to be 146, and theoretically be 18 to 146, and the foam can hardly be obtained outside this range. The polymer length increases the hydrophobicity and stability of the foam. It was found that the maximum length of the polymer chain in this system is 146, and the polymer length does not further increase by adding more styrene monomer.

Figure 1:
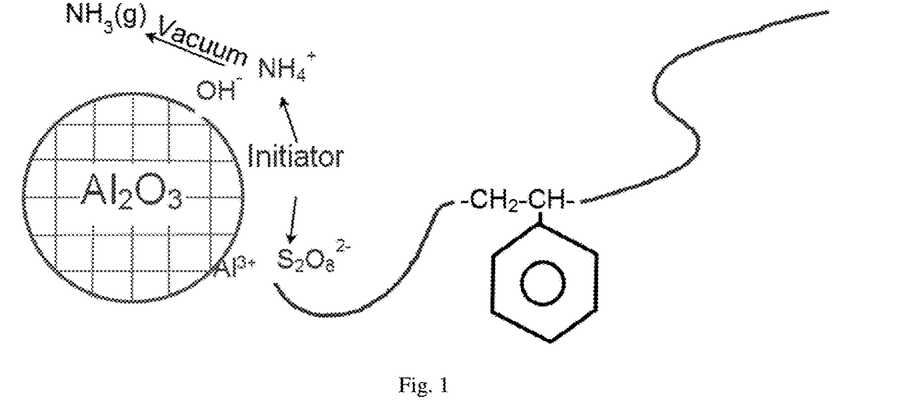
FIG. 1 is a schematic presentation of polystyrene grafted on the surface of alumina nanoparticles according to Example 1 of the present application.

Connections Between ANs and PS:

FIG. 1 illustrates how the polystyrene was grafted on the surface of alumina nanoparticles. In aqueous media at a pH value around 5, alumina nanoparticles (ANs) have a zeta potential of +50 mV screened by counterions (determined by a dynamic light scattering (DLS) test) to give an electric double layer. These counterions ensure efficient dispersion of ANs at a concentration below 0.1 vol % without any aggregation. When ANs were dispersed in water, —$OH_2^+$ groups were generated from the surfaces of the nanoparticles, which attracted the oxidizing anions of APS. Therefore, the hydrophobic polymer can be introduced to the surfaces of ANs by an in-situ emulsion polymerization with the surfactant of sodium dodecyl sulfate (SDS). Nanoparticle surfactant containing both hydrophilic and hydrophobic groups was fabricated (FIG. 1). To prove the connection mechanism, time-of-flight secondary ion mass spectrometry (ToF-SIMS) was employed to obtain the characteristic ion peaks of PS-grafted-AN nanoparticle surfactant. With the unique $Al^+$ as reference, the appearance of peak at mass of 137 proved the existence of $AlSO_4CH_2^+$, which represents the bonding groups between PS and ANs. XPS spectra showed that the atomic ratio of carbon and aluminum is only 0.8, indicating that very small amount of PS was grafted on the surfaces of ANs.

Figure 2A:
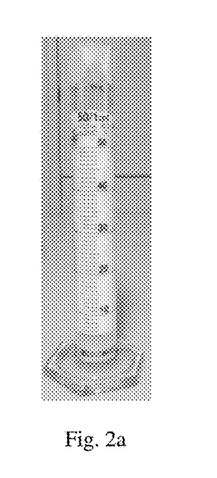
FIG. 2a shows the freshly prepared foam in Example 2.
Figure 2B:
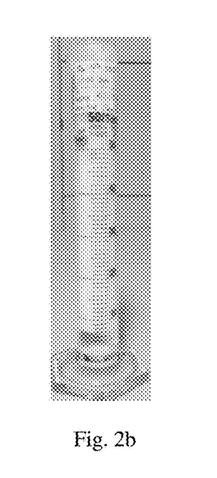
FIG. 2b shows the foam of FIG. 2a after being maintained in air for one month.

Stability of the Foam:

The slight grafting of PS on the surfaces of ANs provides the generated foam with noteworthy stability. As shown in FIG. 2a, the fresh wet foam was injected in a transparent measuring cylinder. After being maintained in air for one month, neither the volume nor the shape of the foam changed (see FIG. 2b). The liquid level at the bottom of the foam rose from 5 ml to 7 ml, indicating that liquid in the foam drained down due to the gravity. However, the boundary of bubble strengthened by PS-grafted-ANs was not weakened and the bubbles did not break and coarsen.

Figure 2C:
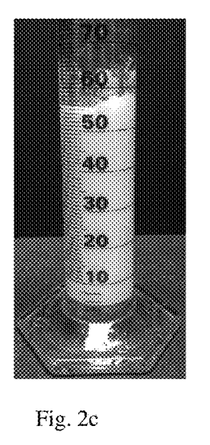
FIG. 2c shows the original shape of the freshly prepared foam in Example 2.
Figure 2D:
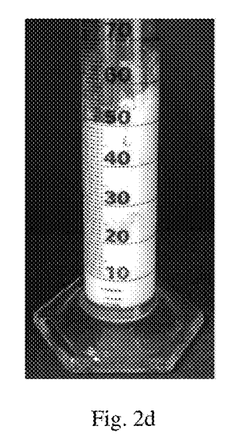
FIG. 2d shows the foam of FIG. 2c after being dried at 80° C. overnight in an oven.

Another piece of evidence that strongly supports the stability of the foam can be found from a heat-drying process. A piece of the fresh wet foam was put in a cylinder (FIG. 2c), and dried in an oven at 80° C. overnight. It was found that the foam still retained its original shape even after thorough drying, accompanied with slight volume shrinkage (FIG. 2d). The dried foam has a density of about 1.2 kg/m³. The dried foam was finely ground into dried alumina foam powder (DAP).

Example 3—Relations Between Composition and Stability of the Foam

The relations between composition and stability of the foam were investigated. Similar to Example 1, a series of 0.25 wt % AN suspensions according to APS concentrations of 37.5 ppm, 75 ppm, 150 ppm, 300 ppm, 500 ppm and 1000 ppm were prepared. Zeta potentials of the ANs were measured and illustrated in FIG. 3a.

Figure 3A:
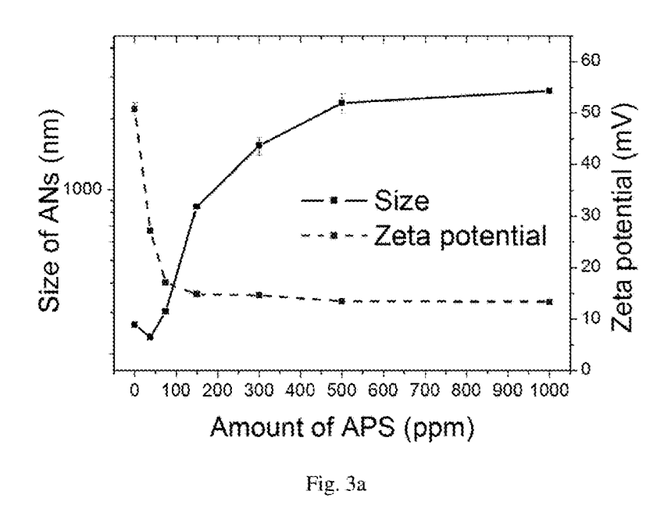
FIG. 3a is a graph showing the zeta potentials and particle sizes against the amount of APS in the AN suspensions in Example 3.
Figure 3B:
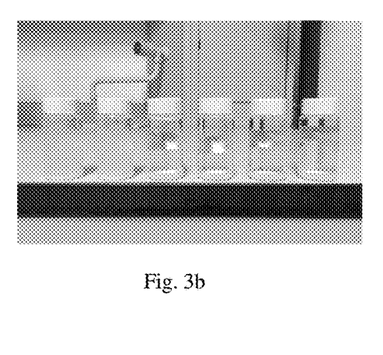
FIG. 3b shows the AN suspensions according to APS concentration (from left to right: 37.5 ppm, 75 ppm, 150 ppm, 300 ppm, 500 ppm and 1000 ppm).
Figure 3C:
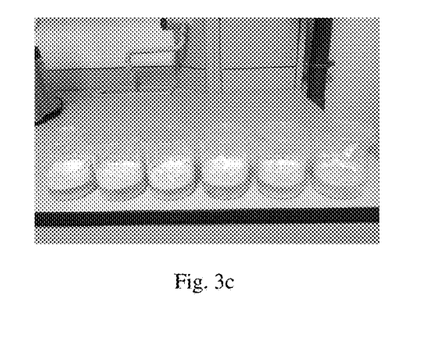
FIG. 3c shows foam generated from the AN suspensions according to APS concentration (from left to right: 37.5 ppm, 75 ppm, 150 ppm, 300 ppm, 500 ppm and 1000 ppm).

The uniform grafting of PS on the surfaces of nanoparticles requires a homogeneous dispersion of ANs in the suspension during the synthesis. The original ANs had a zeta potential of +50 mV screened by counterions, which ensuring efficient dispersion of ANs at a concentration below 0.1 vol % without any aggregation in water. However, during the synthesis, the adsorption of the initiator APS on the surfaces of ANs decreased the zeta potential. As shown in FIG. 3a, with the presence of only 150 ppm APS, the zeta potential of ANs dropped from +50 mV to +14.8 mV, leading to an obvious precipitation (sample 3 in FIG. 3b). In this case, ANs aggregated before the homogeneously grafting of PS, and the foams generated in such suspensions were not stable. In FIG. 3c, the foams in the suspensions containing 150 ppm APS or more (samples 3-6) all became coalescent and disproportionated, and even dissolved in the suspension after standing for one day. Therefore, the ratio between ANs and APS in the suspension is important to fabricate stable foams. The addition of APS should be enough for the PS polymerization while not too much to precipitate the ANs.

Example 4—Comparison of AN Stabilized Foam and PS-Grafted-AN Stabilized Foam

Optical microscopy (OM) tests were employed to characterize the morphology of the stable PS-grafted-AN stabilized foam. For reference, AN stabilized foam without the presence of APS and PS was also prepared for the tests.

Preparation of AN Stabilized Foam:

0.5 g ANs and 0.1 g SDS were added into 200 mL deionized water and stirred at 650 rpm at 80° C., 1 atm for 6 hours. The generated foam was floated on water and was taken out from the reactor by injecting water into the flask. The foam was later thoroughly dried in an oven at 80° C. overnight.

Preparation of PS-Grafted-AN Stabilized Foam:

0.5 g ANs, 0.015 g APS and 0.1 g SDS were added into 200 mL deionized water and stirred at 10 rpm for 1 minute to form a suspension. Then 1 mL styrene was added slowly at 0.5 ml/min into the suspension under stirring at 300 rpm. The suspension was then stirred at 650 rpm at 80° C., 1 atm for 6 hours. The generated foam was floated on water and was taken out from the reactor by injecting water into the flask. The foam was later thoroughly dried in an oven at 80° C. overnight.

Figure 4A:
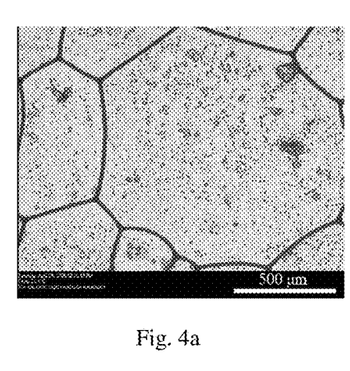
FIGS. 4a and 4b respectively are optical microscopic images of bubbles in the AN stabilized foam and PS-grafted-AN stabilized foam in Example 4.
Figure 4B:
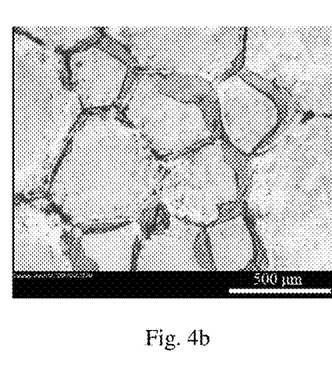

As shown in the optical microscopic images in FIGS. 4a and 4b, bubbles in both foams impacted each other and formed polygonal shape. The bubble size of the AN stabilized SDS foam is around 500 to 1000 μm in diameter (FIG. 4a), while the bubbles of PS-grafted-AN foam have much smaller sizes of 100 to 500 μm in diameter (FIG. 4b). The boundary among the bubbles of PS-grafted-AN foam is much thicker than that of AN stabilized SDS foam.

Figure 4C:
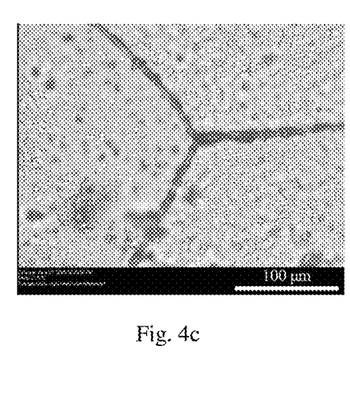
FIGS. 4c and 4d are the respective enlarged images of FIGS. 4a and 4b.

An enlarged image in FIG. 4c shows that the boundary in AN stabilized SDS foam only includes transparent liquid film with a thickness of 5 μm. It can be seen that original ANs dispersed homogeneously in the liquid film, and flowed easily with the liquid. After the thorough heat-drying process (FIG. 4e), the liquid at the bubble boundary was totally evaporated, resulting in a collapse of the three dimensional foam structures. Thus only irregular fragments could be found after the heat-drying of AN stabilized SDS foam.

Figure 4D:
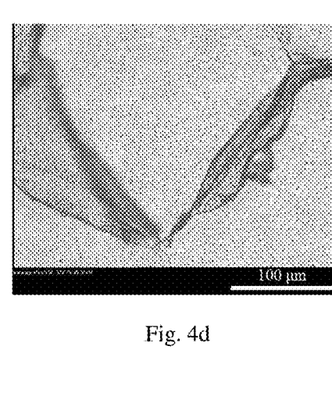
Figure 4E:
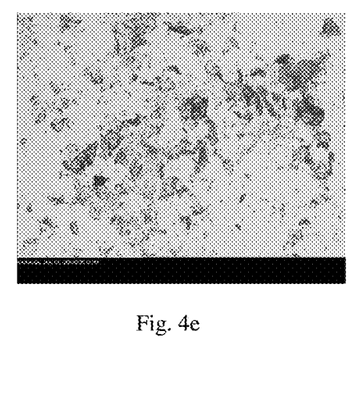
FIGS. 4e and 4f respectively are optical microscopic images of bubbles in the AN stabilized foam and PS-grafted-AN stabilized foam in Example 4 after being thoroughly dried.
Figure 4F:
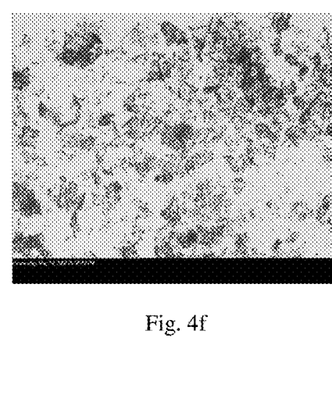

However, with the grafting of PS on the surfaces, ANs tend to form an oriented aggregation at the boundary of the bubbles. The hydrophobic PS groups formed a regular arrangement to the air phase, while the hydrophilic AN parts aggregated regularly in the water phase, and formed strong AN films at the boundary (FIG. 4d). The AN film protected the bubble from coalescence and disproportionation even after the removal of water. A regular porous structure can still be observed even after the heat-drying of PS-grafted-AN foam (FIG. 4f).

Example 5—Structure Characterization of the Foam

Figure 5A:
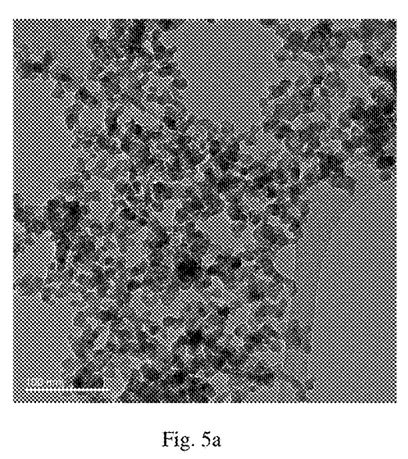
FIGS. 5a and 5b respectively are TEM images of ANs without any surface modification and polymer grafted ANs.
Figure 5B:
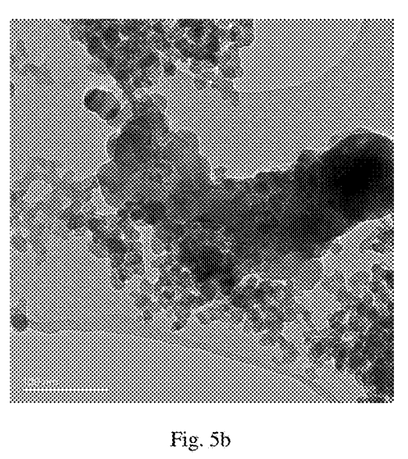
Figure 5C:
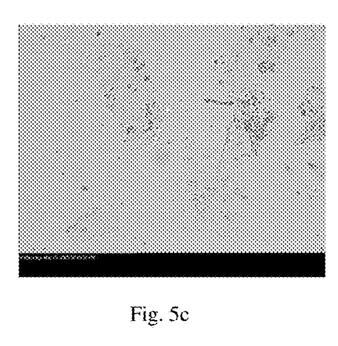
FIG. 5c is an optical transmission micrograph of dried PS-grafted-AN stabilized foam in Example 5.

The structure of the films at the boundary of the bubbles can be characterized by transmission electron microscopy (TEM). Without any surface modification, the original ANs with particle size around 13 nm dispersed homogenously in a dried suspension prepared by dispersing 0.25 wt % ANs in water stirring for 6 h, and slight aggregation can be observed (FIG. 5a). After the polymer grafting by adding 0.0075 wt % APS, 0.05 wt % SDS and 0.5 wt % styrene in the same suspension and stirring at 650 rpm for 6 h, ANs tend to gather together under the orientation of hydrophobic PS groups. Because the atomic ratio between carbon and aluminum is only 0.8 based on the XPS characterization, it can be seen that the film mainly includes ANs, while the small content of PS only orientated the aggregation of ANs. As shown in FIG. 5b, the aggregation film seems to be a single-layer packing of the ANs, which greatly decreases the required concentration of ANs for the formation of the stable foam.

Figure 5D:
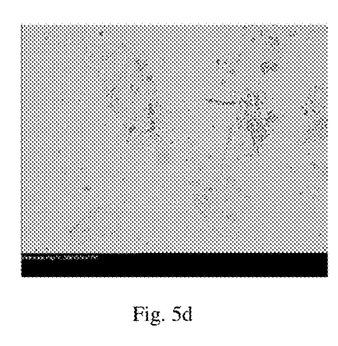
FIG. 5d is an optical transmission micrograph of PS-grafted-AN stabilized foam in FIG. 5c after being heated to 280° C.

When the ANs foam was dried and heated from room temperature to 280° C., which is higher than the melting point of PS (230° C.), no morphology change was observed from the optical transmission micrographs (FIGS. 5d and 5d). It was demonstrated that the film at the boundary among the bubbles mainly included oriented PS-grafted-AN aggregates, which provided enough mechanical strength to protect the foam from coalescence and disproportionation.

Example 6—Fabrication and Mechanical Properties of Foam Concretes and Comparison with Commercially Available Foaming Agent The foam and foam concrete of the present application were compared with a commercially available foaming agent, Darex AE S45, from GRACE. The foam of the present application was prepared following the procedure in Example 1. The foam of the commercially available foaming agent Darex AE S45 was prepared by stirring a 2.4 wt % solution of this foaming agent at 650 rpm for 5 min.

Figure 6A:
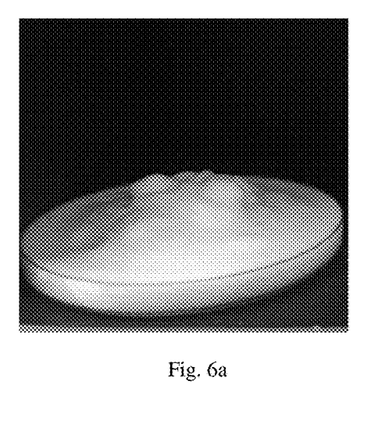
FIGS. 6a and 6b respectively are optical photos of the foam prepared by the foaming agent Darex AE S45 and the foam of Example 6.
Figure 6B:
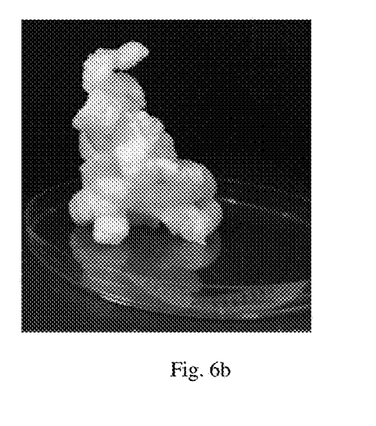
Figure 6C:
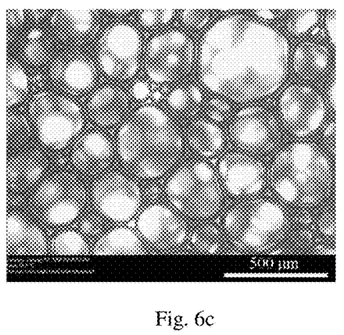
FIGS. 6c and 6d respectively are microscopy photos of the foam prepared by the foaming agent Darex AE S45 and the foam of Example 6.
Figure 6D:
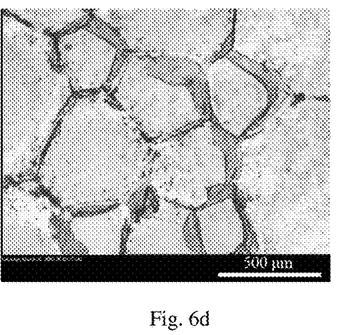

As shown in the optical photo in FIGS. 6a and 6b, the stability of the PS-grafted-AN stabilized foam of the present application is much better than that of the GRACE foam. The PS-grafted-AN stabilized foam can support its weight and be made with different shapes. The microscopy photos in FIGS. 6c and 6d demonstrate that there are films at the interface of the bubbles of the PS-grafted-AN stabilized foam, which provide strength to stabilize the foam.

The above stable foam of the present application was mixed with Portland cement paste at pH of 12 to cast light-weight foam concretes with different densities ranging from 220 to 500 kg/m$^3$. Foam concrete with density of 450 kg/m$^3$ using Grace foam was prepared for comparison. The foam concretes were cast by adding the foam into Portland cement with water to cement ratios (w/c) from 0.3 to 0.6, and mixed under blending speeds from 200 to 650 rpm. Then the paste was casted into a mold with a size of 40×40×40 mm$^3$. The specimens were demoulded after 3 days and maintained in humidity for another 25 days. The Portland cement used satisfies the requirements of BS EN197-1:2000 (a European standard that was adopted as a British Standard) for CEM I Portland cement of strength class 52.5 N (roughly equivalent to the requirements of ASTM C150 for Type I Portland cement).

Figure 6E:
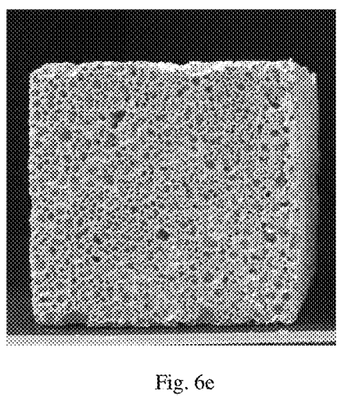
FIGS. 6e and 6f respectively are optical photos of the foam concrete casted by the foam prepared by the foaming agent Darex AE S45 and the foam of Example 6.
Figure 6F:
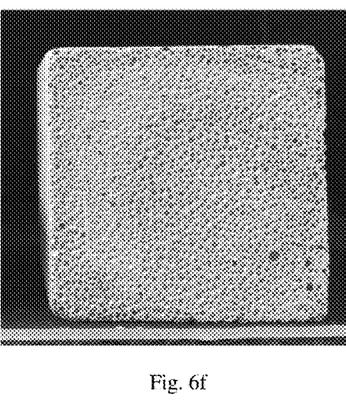
Figure 6G:
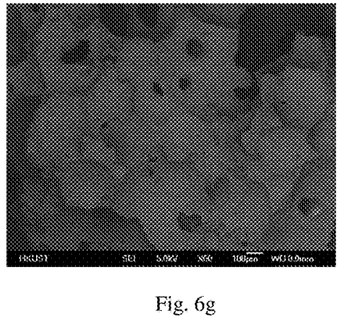
FIGS. 6g and 6h respectively are SEM images of the foam concrete casted by the foam prepared by the foaming agent Darex AE S45 and the foam of Example 6.
Figure 6H:
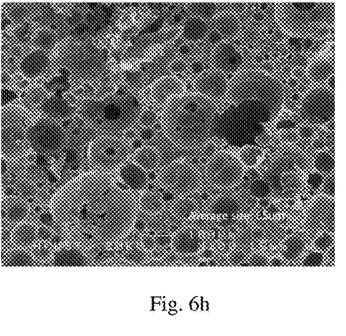

Owing to the strengthened bubble interfaces, the foam concrete casted by the PS-grafted-AN stabilized foam has a smaller pore size than that of the GRACE foam, as shown in the optical photos (FIGS. 6e and 6f) and the ultra-high resolution scanning electron microscope (SEM) images (FIGS. 6g and 6h). At the same density of 450 kg/m$^3$, the foam concrete casted by the PS-grafted-AN stabilized foam has a compressive strength of 2 MPa, while the one casted by GRACE foam is only 0.4 MPa.

Figure 7A:
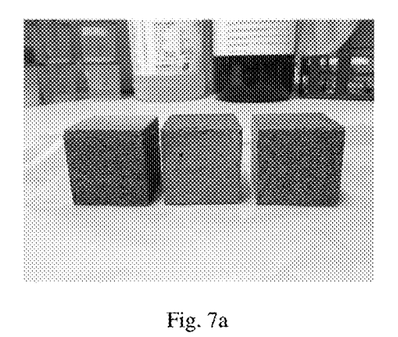
FIG. 7a show the foam concretes in Example 6 with different densities, from left to right: 450 kg/m$^3$, 220 kg/m$^3$ and 350 kg/m$^3$.
Figure 7B:
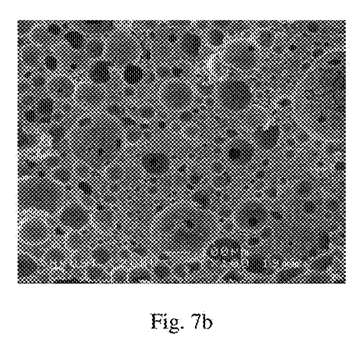
FIG. 7b is the SEM image of the foam concrete in Example 6 with density of 350 kg/m$^3$.

As shown in FIG. 7a, even the foam concrete casted by the PS-grafted-AN with ultra-low density (220 kg/m$^3$, the middle one in FIG. 7a) demonstrated good aspects without any obvious defects. The porous structure of the specimen with density of 350 kg/m$^3$ can be seen in the SEM image (FIG. 7b). A large number of pores distributed homogeneously in the cement matrix, with an average diameter of 65 μm.

Figure 7C:
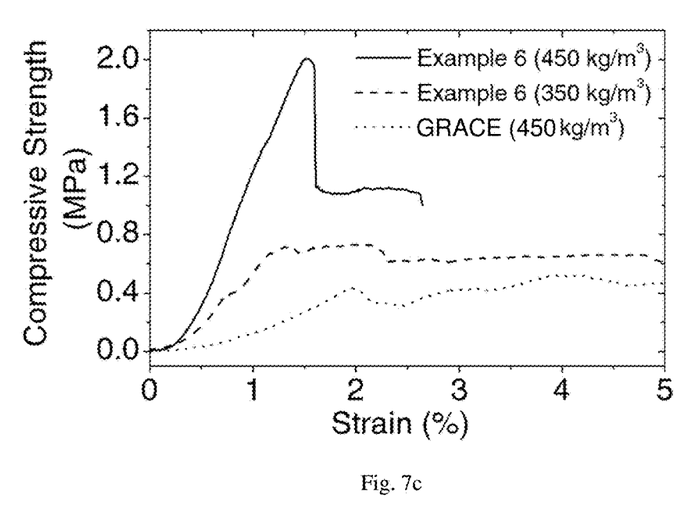
FIG. 7c shows the compressive stress-strain curves of the foam concretes of Example 6 with densities of 450 kg/m$^3$ and 350 kg/m$^3$.

A compressive test was employed to characterize the mechanical properties of the light-weight concretes. The test was carried out with the crosshead speed of 1 mm·min$^{-1}$ and stopped at the strain of 25%. As shown in FIG. 7c, the compressive strengths reach 2 MPa and 0.8 MPa of the specimens with densities of 450 kg/m$^3$ and 350 kg/m$^3$, respectively. These values are much higher than that of the reported values of specimens made from the commercial foaming agent. Moreover, the compressive stress-strain curve of the specimen with density of 350 kg/m$^3$ shows an unusual flat stage after the first cracking, which provides more toughness to the specimen. Normally, the stress drops immediately after the first cracking of the foam concrete, indicating the thorough destruction of the specimen. However, the homogeneously dispersed tiny pores in foam concretes prevent the crack extension after the cracking. When the cracking occurs, the stress remains almost the same accompanied with the increase of strain. This phenomenon is similar with the compressive behavior of porous alloy, and makes the foam concretes possible to be applied in cushion materials.

Example 7—Compression Tests of Foam Concretes

Foam concretes with various densities from 150 kg/m$^3$ to 2000 kg/m$^3$ were cast by adding either the foam or the dried alumina foam powder (DAP) from Example 2 into Portland cement following the procedures in Example 6.

For instance, 100 mL PS-grafted-AN foam from Example 2 was mixed with 35 g cement and 12 g water, and then stirred at 650 rpm for 3 mins. The obtained foam paste was casted into a mold with a size of 40×40×40 mm$^3$, and demoulded after 3 days. A foam concrete specimen with density of 450 kg/m$^3$ was obtained after maintained the demoulded sample in humidity for another 25 days and dried in oven at 80° C. overnight.

For the fabrication of foam concrete using DAP, 0.2 g DAP powder was mixed with 13 g cement and 17.84 g water, and then stirred at 650 rpm for 3 mins. The obtained foam paste was casted into a mold with a size of 40×40×40 mm$^3$, and demoulded after 3 days. A foam concrete specimen with density of 350 kg/m³ was obtained after maintaining the demoulded sample in humidity for another 25 days and dried in oven at 80° C. overnight.

Compression tests of all the specimens were carried out with the crosshead speed of 1 mm·min⁻¹ and stopped at the strain of 25%. The compressive strengths are 2 MPa, 0.8 MPa and 0.4 MPa of the foam concretes for the present application with density 450 kg/m³, 350 kg/m³, and GRACE product with density 450 kg/m³, respectively, as shown in FIG. 7c. The test result for foam concrete casted by DAP is also 2 MPa and 0.8 MPa with density 450 kg/m³ and 350 kg/m³, respectively.

Thus, the foam formulations and the methods of preparing solid porous materials have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "includes", "including", "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A formulation for preparing a partially polymer-grafted nanoparticle stabilized foam, comprising:
    alumina nanoparticles in an amount between 0.01 to 1 wt % of the formulation,
    monomers containing an unsaturated hydrocarbon group, wherein the monomers consist of styrene monomers, wherein the amount of monomers is 0.5 wt % of the formulation,
    a polymerization initiator,
    a surfactant, and
    water.

2. The formulation of claim 1, wherein the amount of water is between 90.0 to 99.9 wt % of the formulation.

3. The formulation of claim 1, wherein the polymer-grafted nanoparticle stabilized foam is a homogeneously foamed or partially foamed suspension formed in presence of a gas, and wherein the homogeneously foamed or partially foamed suspension comprises a dispersed phase and a continuous medium of water and/or the hydrophilic solvents wherein the dispersed phase comprises the nanoparticles, the monomers, the initiator, and the surfactant.

4. The formulation of claim 3, wherein the polymer grafted nanoparticle stabilized foam is stable at a temperature of about 25-100° C.

5. The formulation of claim 3, wherein the homogeneously foamed or partially foamed suspension is stirred at a stirring speed in the range of about 500-1000 rpm.

6. The formulation of claim 1, wherein the nanoparticles have mean particle sizes ranging from about 10 to about 500 nm.

7. The formulation of claim 1, wherein the pH value of the formulation is ranged from about 3 to about 8.

8. The formulation of claim 1, wherein the initiator comprises at least one member selected from the group consisting of ammonium persulfate (APS), potassium persulfate (KPS), sodium persulfate (SPS), 2,2'-Azobis(isobutyramidine) dihydrochloride (NA), and any combinations thereof.

9. The formulation of claim 1, wherein the surfactant comprises at least one member selected from the group consisting of sodium dodecyl sulfate (SDS), sodium dodecyl benzene sulfonate (SDBS), anionic polyacrylamide (APAM), sodium hydroxyethyl sulfonate, ammonium dodecyl sulfate, sodium dodecyl ether sulfate, sodium myreth sulfate, octenidine dihydrochloride, cetrimonium bromide (CTAB), cetylpyridinium chloride (CPC), benzalkonium chloride (BAC), benzethonium chloride (BZT), dimethyldioctadecylammonium chloride, dioctadecyldimethylammonium bromide (DODAB), polyoxyethylene glycol alkyl ethers, polyoxypropylene glycol alkyl ethers, glucoside alkyl ethers, polyoxyethylene glycol octylphenol ethers, polyoxyethylene glycol alkylphenol ethers, glycerol alkyl esters, polyoxyethylene glycol sorbitan alkyl esters, sorbitan alkyl esters, dodecyldimethylamine oxide, block copolymers of polyethylene glycol and polypropylene glycol, polyethoxylated tallow amine, and any combinations thereof.

10. The formulation of claim 1, wherein the concentration of surfactant is between 0.001 wt % to 1 wt % of the formulation.

11. The formulation of claim 1, wherein the polymer grafted nanoparticle foam is further dried at temperatures higher than about 35° C. to give a self-supporting monolith.

12. The formulation of claim 11, wherein the self-supporting monolith is to be implanted into water, a suspension of water or inorganic particle paste, and to be foamed by physically stirring or using a foaming machine.

13. The formulation of claim 12, wherein the inorganic particle paste comprises at least one member selected from the group consisting of Portland cement, magnesium potassium phosphate cements (MPCs), geopolymers, gypsum, oxides, carbides, nitrides, phosphates, carbonates, polysaccharides, salts, metals, polymers, fats, and any combinations thereof.

14. A method of preparing solid porous materials, comprising:
    generating a wet polymer-grafted nanoparticle stabilized foam from the foam formulation of claim 1, mixing the foam with a matrix, drying the foam to remove any solvent, and sintering the dried foam to give a sintered material.

15. The method of claim 14, wherein the wet foam is freshly prepared or by mixing a dried foam prepared from the foam formulation of claim 1 with water.

16. The method of claim 14, wherein the foam is dried by air drying, freeze drying, unidirectional drying or slip casting.

17. The method of claim 14, wherein the sintered material is used as a non-structural construction and building material comprising a façade panel, a partition wall, a thermal insulating wall, or a sound proof wall.

* * * * *